A. C. CHENOWETH.
PROTECTIVE REINFORCED CONCRETE CONSTRUCTION.
APPLICATION FILED JULY 10, 1913.

1,187,502.

Patented June 20, 1916.
4 SHEETS—SHEET 1.

WITNESSES:
Edward Hayes

INVENTOR
Alexander Crawford Chenoweth
BY
Willis Fowler
ATTORNEY

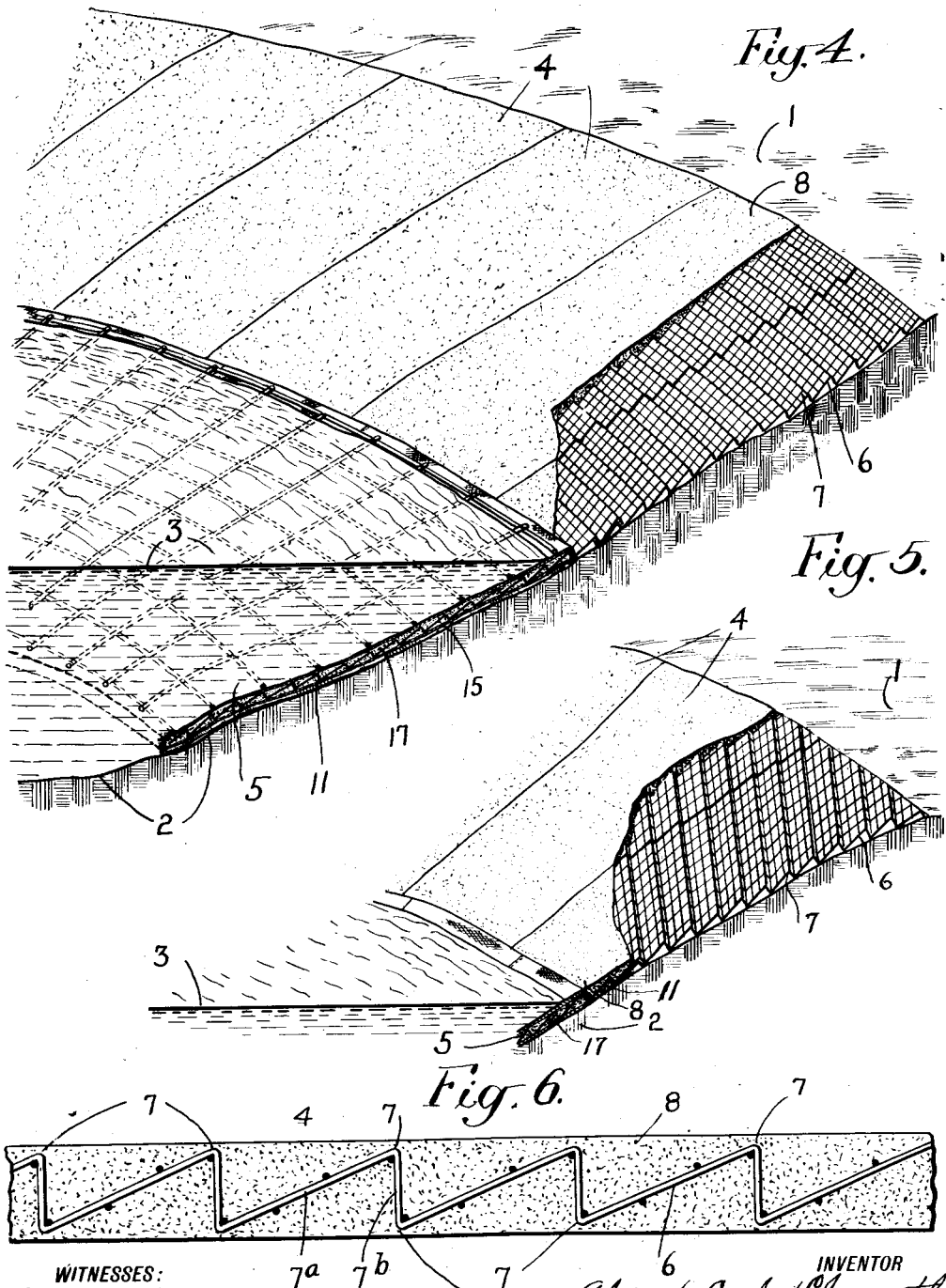

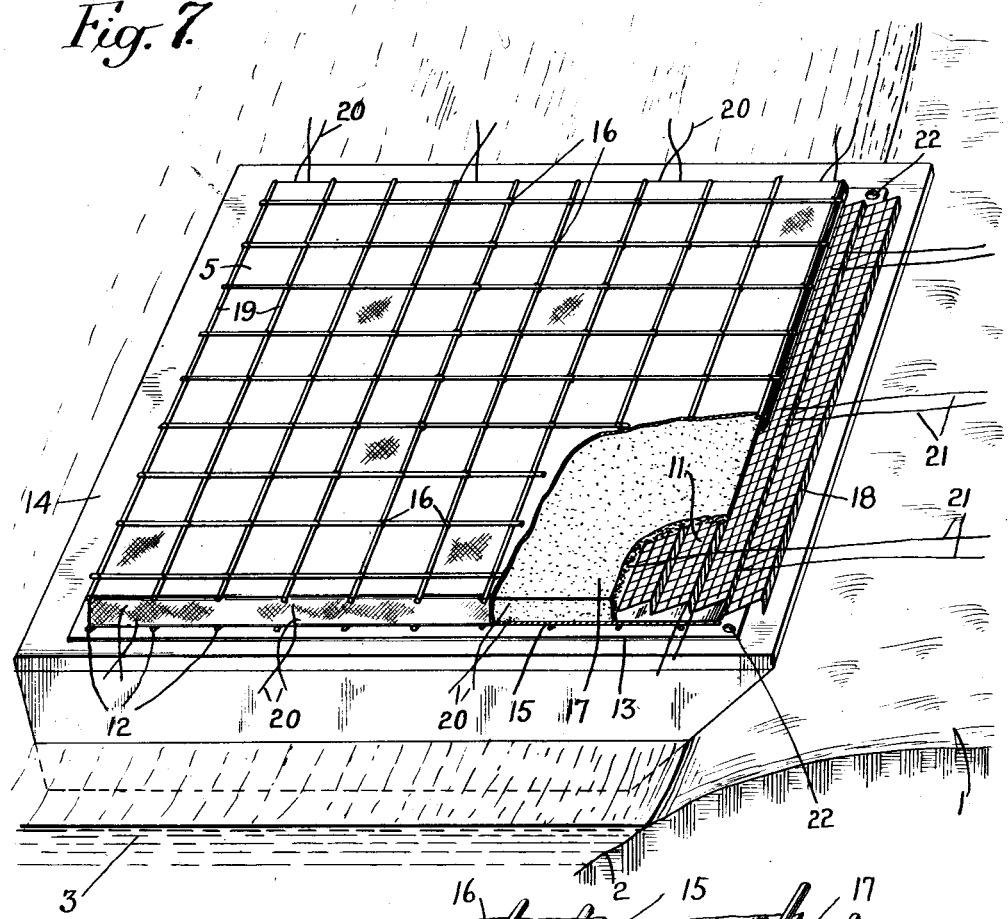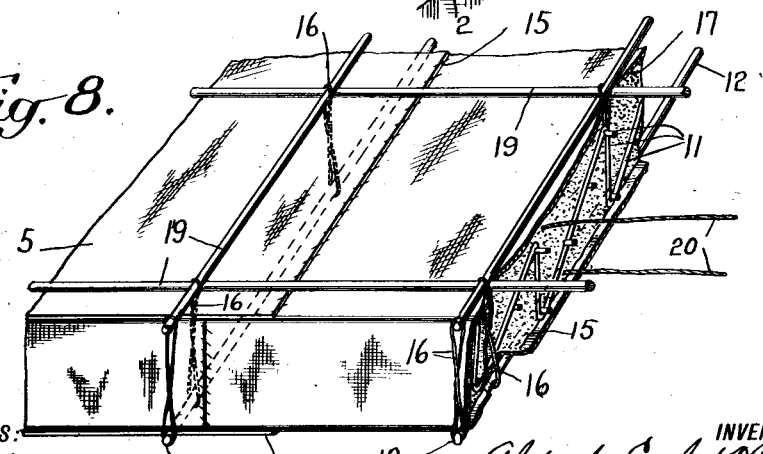

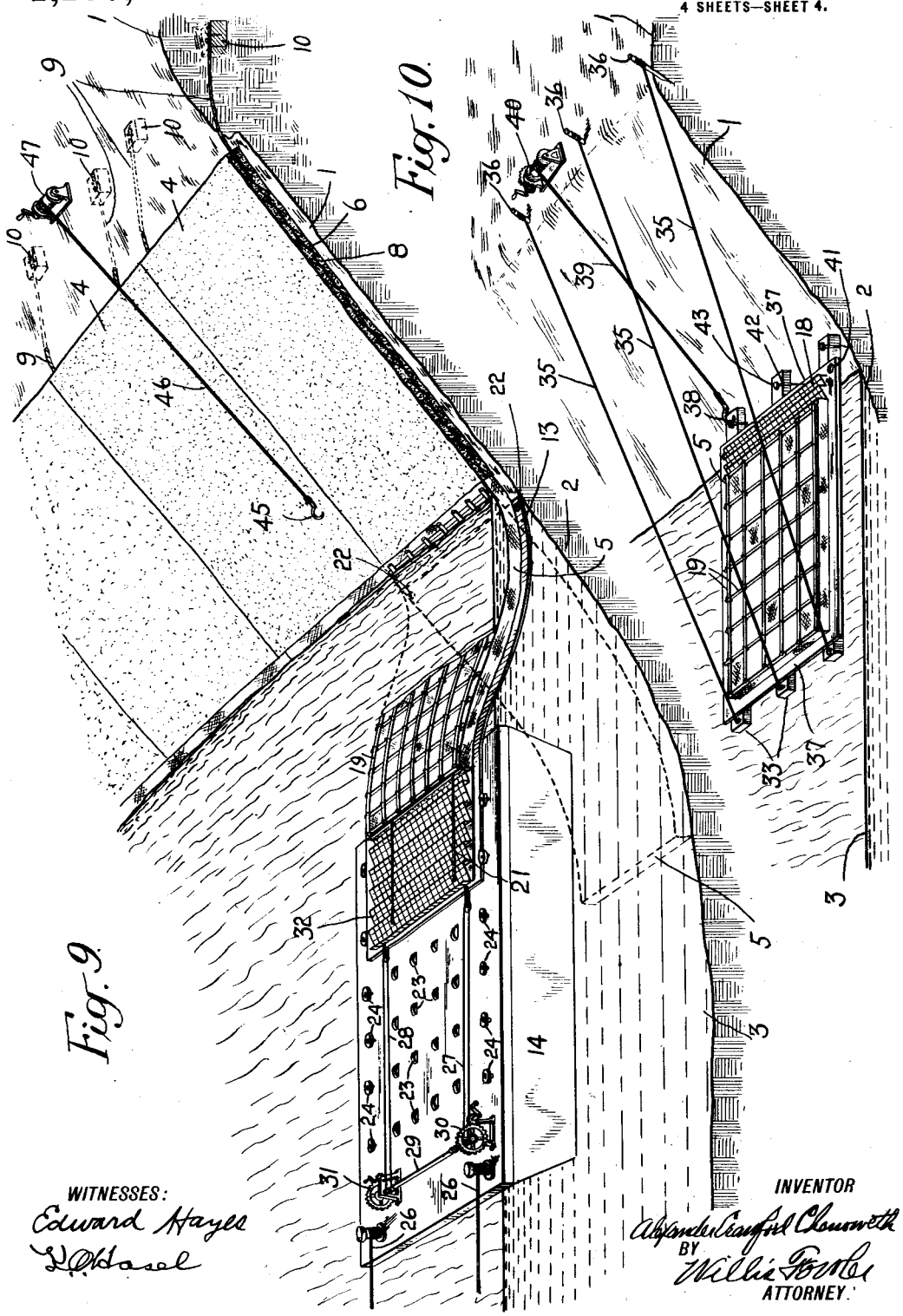

UNITED STATES PATENT OFFICE.

ALEXANDER CRAWFORD CHENOWETH, OF NEW YORK, N. Y.

PROTECTIVE REINFORCED CONCRETE CONSTRUCTION.

1,187,502. Specification of Letters Patent. Patented June 20, 1916.

Application filed July 10, 1913. Serial No. 778,291.

*To all whom it may concern:*

Be it known that I, ALEXANDER CRAWFORD CHENOWETH, a citizen of the United States, residing in the borough of Brooklyn, county of Kings, city and State of New York, have invented certain new and useful Improvements in Protective Reinforced Concrete Construction, of which the following is such a full, clear, and exact description as will enable any one skilled in the art to which it appertains to make and use the same, reference being had to the accompanying drawings, forming part of this specification.

My invention relates to reinforced concrete or cement construction, which is particularly well adapted for protecting subaqueous surfaces, such for instance as river beds, embankments, levees, irrigation ditches and the like, in order to protect the earth at such points against the erosion caused by floods and the action of the river.

The principal objects of my invention are to provide a practically continuous and durable revetment or lining for water-side slopes, and one that will readily conform to the uneven surface on which it is placed before the concrete or cement has set, and to bring each wire element in the reinforcing wire netting into its proper relative position each side of the neutral axis, so as to render the reinforcement of the wire netting to the best advantage and causing each such element to act either as a compression or tension member.

A further object of my present invention is to dispense with all extraneous forms or holders, such as are ordinarily used in making reinforced bodies of cemental material for the purpose of holding the plastic material in place during the hardening process, and to cause the reinforcing and trussing element itself to serve as a receptacle or form for retaining the plastic concrete in its proper place during the hardening process.

With these and other objects in view, my invention consists in the particular construction and arrangements of the different parts of the article itself, all as hereinafter fully set forth and then pointed out in the claims.

I have illustrated types of my invention in the accompanying drawings, wherein:—

Figure 1:
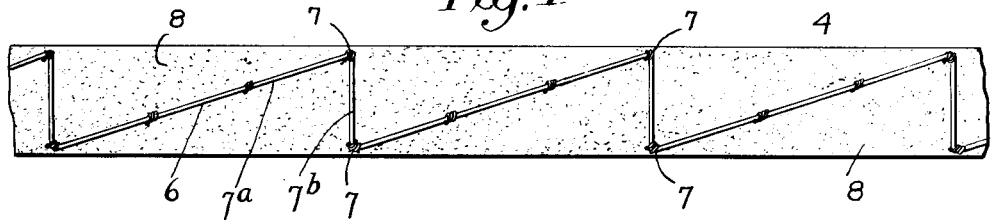
Figure 2:
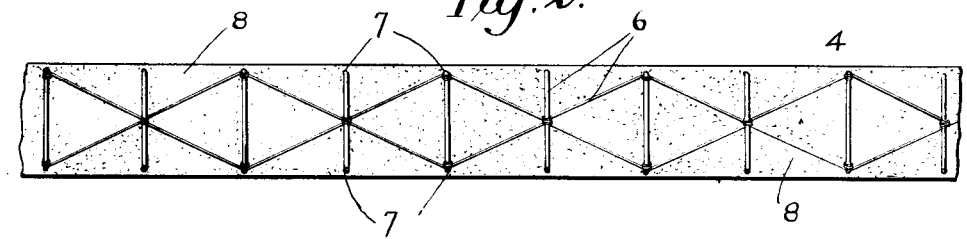
Figure 3:
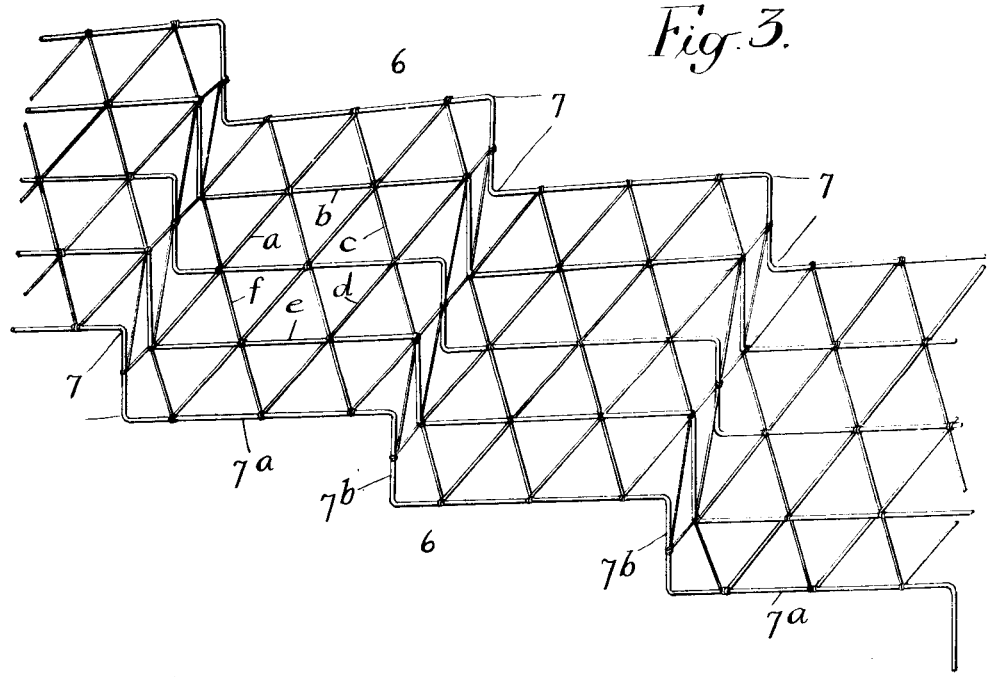

Figure 1 is a cross sectional view of one of my improved reinforced protective slabs, the section being taken in a plane at right angles to the ridges formed in the reinforcing fabric. Fig. 2 is a similar view to that of Fig. 1, but with the plane of the section taken through the slab at right angles to that shown in Fig. 1. Fig. 3 is a perspective view of a portion of my improved reinforcing device or fabric. In this construction the mesh of the reinforcing netting is triangular shaped and the ridges or elevations are parallel with each other. Fig. 4 is a perspective view, on a reduced scale, of a portion of a river, and shows the river bank and bed as covered with my improved reinforced revetment, and with a portion of the revetment which lies out of the water broken away, in order to show the particular location of the reinforcing fabric or netting. Fig. 5 is a similar view to that shown in Fig. 4, but with the ridges in the reinforcing wire netting arranged diagonally instead of running substantially at right angles to the slope of the ground. Fig. 6 is an enlarged cross sectional view of the slabs shown in Fig. 4, and in which the mesh of the netting is shown as rectangular shaped. Fig. 7 is a perspective view of a portion of a river showing a float or platform upon which has been made one of my improved reinforced slabs, which, in plastic condition, is to be removed from the float and placed in position on the riverbed beneath the water. The right hand end of the reinforced slab shown in this view has projecting from the edge thereof, the end of the reinforcing sheet of wire netting, and the lower right hand corner of the slab is partly broken away. Fig. 8 is an enlarged perspective view of a portion of the reinforced slab shown in Fig. 7, and with one edge broken away. Fig. 9 is a perspective view of a portion of a river, and shows the bank above the water line as lined with the protective reinforced slabs of material and with a protective slab being dropped from the float on which it has been made into position in the water, and with a fresh section of the reinforcing netting connected with one end of the plastic slab in the operation of building an extension of the slab to increase its length. Fig. 10 is a perspective view of a portion of a river showing a temporary platform rigged in operative position upon the exposed portion of the bank and overhanging the water, and on which platform has been made one of my improved reinforced sections prior to transferring the same from the platform to the bed of the river.

Referring to the drawings, in which like numbers of reference designate like parts throughout, 1 indicates the embankment or levee of a river, 2 the bed and 3 the water in the river. The embankment 1, is continuously covered over a sufficiently wide area with a series of protective reinforced sections or slabs 4, while a corresponding portion of the river bed 2, immediately adjoining the bank at the water line is likewise covered with a series of the connected protective slabs 5, thereby providing a substantially unbroken smooth protective coating for the earth at the places specified. This protective coating is installed by constructing the slabs or coverings one at a time, those which cover the exposed river bank being made directly upon the ground by first cleaning the ground and properly sloping and grading it, and then placing directly upon it a suitably shaped sheet of steel wire-netting 6, which is formed with parallel bends or ridges 7, which in the preferred form run substantially at right angles to the slope of the ground as indicated in Fig. 4. After the bent wire-netting is placed in position directly on the ground, concrete 8, is then placed upon it in plastic condition, so as to fill all of the cavities formed by the bends upon the upper and lower sides of the netting, the thickness of the layer required being previously determined by the aggregate height of the bends upon opposite sides of the neutral axis. The concrete is then rammed and tamped to make it compact and to even its surface, and it is then left to harden. By this construction, the crimped and deformed wire-netting is completely embedded in the concrete and the particular shape of the netting brings each of the wires into its proper relative position each side of the neutral axis, so as to give the best reinforcement, each wire becoming either a compression member or a tension member. In addition to the bent wire serving as a truss within the body of concrete, it also acts as a receptacle or form by means of which the plastic concrete, when placed upon the wire-netting, is retained in place and may set or harden without becoming displaced, even though the construction of the reinforced section takes place upon steep inclines of ground. I prefer to have the ridges 7, extend in a direction substantially at right angles to the slope, and as indicated in several of the figures, but the ridges may run in a diagonal direction if preferred, as indicated in Fig. 5. The wire-netting shown in several of the figures has a rectangular shaped mesh, but in the form shown in Figs. 1, 2 and 3, the mesh is of a well known triangular shape. This steel wire-netting having the triangular mesh provides a very strong trussing structure when incorporated in the body of concrete, and it of course also acts as a receptacle or form in retaining the plastic concrete in place during the hardening process. This particular wire mesh is a well known commodity on the market and I prefer to use it in many cases.

In placing the protective sections 4, upon the bank, as soon as one has been completed, the adjoining one is begun by placing a sheet of wire-netting 6, on the ground immediately adjoining the last made section, so as to bring the abutting edges of the sheets of wire-netting together, and if preferred, they may be fastened together in any well known manner, or overlapped, so that when the concrete is packed upon the freshly laid sheet of wire-netting it may be made to cover the joint between the adjoining sheets of the wire-netting. In this way a continuous and unbroken lining is formed directly upon the river bank, and the slight flexibility of the wire-netting in one direction, namely, in the direction at right angles to the line of direction of the ridges, serves to readily permit the body of concrete, together with the reinforcing sheet to conform to the shape of the ground upon which the reinforced slab is built.

In order to prevent the slabs 4, from sliding downwardly out of place, I attach to the upper end of each cables 9, which are in turn secured to the anchorages 10, placed in the ground.

The protective reinforced slab or covering 5, which is placed upon the river bed beneath the water is constructed in the same manner as the slab 4, already described, in so far as the wire-netting and concrete is concerned. It is, however, provided with an exterior cover of textile fabric in order to protect the concrete while in plastic condition, from the action of the water in which the slab is deposited, and until the concrete hardens. These slabs 5, are each provided with a reinforcing sheet of bent or deformed wire-netting 11, the same as the wire-netting 6, previously described. In making this slab, a series of strips 12, such for instance as willow boughs, are first placed in parallel order upon the flexible metallic apron 13, which rests upon a platform or float 14, and over these strips is laid a piece of textile fabric 15, such for instance as burlap. Then the sheet of bent wire-netting 11, is placed upon the fabric, and a series of tie-wires 16, are secured to the flexible strips 12, on the bottom and are brought up through the fabric and through the wire-netting and are so positioned as to extend through the body of concrete subsequently placed upon the wire-netting. The concrete 17, is then placed upon the wire-netting and is packed down into a solid body so as to completely embed the netting, except one end thereof which is left free as at 18, (see Fig. 7). The fabric 15, is then folded around the sides and over upon the top of the concrete body so as to completely envelop it. Cross-bars 19, of flexible material are then placed upon the fabric 15, and the tie-wires 16, which are brought up through the concrete and fabric, are secured to the crossing points of the flexible strips 19, as indicated more particularly in Fig. 8.

Suitable cables, 20 and 21, extending at right angles to each other, are incorporated in the body of the slab as it is built up and the ends of these cables protrude at the edges of the slab in pairs as indicated in Fig. 7. These cables may be used for the purpose of dragging the slab into position, and also for the purpose of anchoring it, as well as tying it to the abutting edges of the adjacent slabs. The fabric 15, prevents the water from washing away the cemental material of the slab while in plastic condition and keeps the slab in shape. The strips 12 and 19, hold the fabric in place and also protect the plastic material when the slab is slid on the apron.

The projecting edge 18, of the bent wire-netting is utilized for connecting the sheet of wire-netting with a similar sheet of the netting of the adjacent slab lying above on the bank of the river, as indicated in Figs. 4, 5 and 9, wherein the extension 18, of the slab which is placed upon the river bed, is interlocked with the lower end of the wire-netting of one of the slabs 4, which is subsequently built up upon the sloping ground above the water level.

The flexible apron 13, upon which the slab 5, is constructed, is made of a suitable metal and with sufficient flexibility to readily bend under the weight of the superimposed slab when the apron with the slab upon it is drawn off of the float 14, as indicated more particularly in Fig. 9. The outer end of the apron 13, is provided with perforations 22, for the reception of a hook 45 to which is connected a cable 46 running to the shore where it is operated by a windlass 47, secured to the ground. By this means the apron with its burden may be drawn off the float and the slab deposited upon the river bed. In order to make the apron with its burden move readily off the float when pulled upon, I provide the deck of the float with suitable rollers 23, arranged in the surface thereof, and over which the apron may be moved. I also provide at each side of the line of movement of the apron 13, a row of vertical rollers 24, which keep the apron in place as it is slid off of the float and guides it in its movement.

After the slab 5, is formed upon the apron 13, on the float and is to be launched and dropped into its proper position on the bed of the river, the float is drawn up toward the bank with the forward end of the newly formed slab nearest the bank, as shown in Figs. 7 and 9, whereupon the apron is engaged by the hook 45, and drawn upon, and as it leaves the float it is directed on to the bed of the river near the water line so that its forward end rests upon the bed at about the point of the water line. With the end of the apron held fast at this point on the bank, the float is then drawn gradually away from the bank by means of suitable cables 26, as indicated in Fig. 9, and the weight of the slab bends the apron gradually downwardly on to the bed of the river. When the float has been withdrawn from beneath the greater part of the apron, so as to leave one end still upon the float, the relative movement of the two terminates, and then the float with the apron move together so that the apron is gradually withdrawn from beneath the plastic slab, which finally comes to rest in the dotted line position indicated in Fig. 9. This slab being then in plastic condition, readily conforms to the contour of the surface of the river bed, and its jacket of textile fabric protects the material of the slab from the water until such material has hardened. When the slab is thus deposited upon the river bed, the apron 13, is drawn back upon the deck of the float by means of cables 27 and 28, which are connected with the winding-shaft 29, which is mounted upon one end of the float and is provided at its opposite ends with suitable hand-operated gearing 30 and 31, for winding the cable upon the shaft.

In cases where it is necessary to make the slabs 5, of greater length than can be accommodated by the particular float and apron in use, I first build one of the slabs 5, and start to launch it into position, as indicated in Fig. 9, and when the apron 13, has been partly withdrawn from beneath the completed slab, I stop the operation and place upon the exposed part of the apron a new section of bent wire-netting 32, and connect its forward end with the rear end of the wire-netting contained in the newly formed slab. I then fill in the concrete on the new section of wire netting and complete it, whereupon the withdrawal of the apron from beneath the slab is proceeded with.

By virtue of the flexible apron 13, being projected into the water with the plastic slab upon it, the slab itself is prevented from bending or breaking as might otherwise be the case, though of course these slabs may be launched without the use of the apron. I, however, prefer to use the apron, as it provides a safe means of depositing the plastic slab upon the river bed, and at the same time enables me to lengthen the slab in cases where it is necessary, as above stated.

It will also be noted that the bent wire-netting, in addition to acting as a reinforcing trussing member, also acts to hold the concrete in place while plastic and until it hardens, thereby insuring a perfect reinforced covering for the surface upon which the slab is deposited.

In a reinforced concrete slab in which the reinforcing element lies in the plane of the midsection or neutral axis, such reinforcing element is subjected to bending moments and accordingly it possesses comparatively little strength in resisting strains or stress. It will be noted, that in my improved construction, I incorporate the reinforcing element in the slab in such a position relative to the neutral axis that it is free from bending moments and becomes a compression or tension element, or both, thereby providing increased reinforcing strength.

In using wire-netting either of a triangular or rectangular mesh, I bend the netting into a series of parallel ridges, each of which consists of a short vertical member or leg $7^b$ and a long oblique member or leg $7^a$, and preferably the oblique member is approximately three times the length of the vertical or short member. For example, if the short leg is four inches, the long one is twelve, and in using such a proportion with a triangular mesh netting, the mesh is an equilateral triangle having its sides about four inches long.

The short leg is normal to the upper and under surfaces of the slab and it accordingly serves as an effective barrier or retainer for the plastic material as well as a reinforcing element when the plastic material has hardened. This short leg or stretch is also used as a gage by means of which the thickness of the completed slab may be predetermined, the plastic cemental material being made to cover both the upper and lower ends of the short leg to a slight degree, or if preferred, the ends of the short leg may be made flush with the surface of the slab or permitted to project a slight distance above such surfaces. The long leg extending diagonally from the upper end of one short leg to the lower end of the adjacent short leg provides a highly efficient reinforcing element.

The bends in the netting herein shown are symmetrical and they are alike upon each side of the neutral axis.

In Fig. 10 I show apparatus by means of which the plastic slab 5, may be built up and then deposited upon the river bed at the edge of the water without the use of a float. In this apparatus I use a set of skids 33, which are suitably spaced from each other and their inner ends rest upon the embankment, while their outer ends project out over the water, and they are connected at their outer ends each with a supporting cable 35, the other end of which is made fast to a fixed point 36, on the shore. When the skids are placed in this position, an apron 37, is laid across the skids and constitutes a platform upon which the slab 5, is then built. When a slab is completed, the sustaining cables 35, are slowly let out so as to lower their outer ends into the water and until they rest upon the bed of the river. Then these cables being released, the skids are in turn withdrawn by means of suitable tackle comprising a hook 38, and a cable 39, which is connected with a windlass 40, which is made fast to a convenient point on the shore. When the skids are thus withdrawn, the apron or shield 37, then rests upon the river bed with the slab 5, upon the apron. Then the hook 38, is connected with the apron by means of the perforation 41, therein, and the apron is gradually withdrawn from beneath the slab, thus leaving it directly upon the river bed.

Each skid at its inner end is formed with a socket or perforation 42, through which a long pin 43, is driven into the ground to temporarily hold the end of the skid in place. When the skids are to be removed, the pins 43, are removed and the hook 38, is inserted in the socket 42.

From the foregoing description it will be readily understood that by my improved method large areas of ground can be covered with this particular lining or revetment and can be made continuous in one direction and without joints between the individual slabs, if desired. It will also be noted that steep inclines, as well as level surfaces, may be economically provided with this particular revetment, without necessitating the use of any of the usual forms. My improvements, while particularly applicable to the water-side slope of a river or other body of water, may be used in other places with great advantage. For example, it may be used in roadway construction, and in such use the metal folds may appear on the surface and thereby serve as a protective means for the cemental material and prevent trituration caused by the wheels of vehicles on the roadway, or by floating ice and logs.

As above stated, I prefer to use wire-netting having a triangular mesh instead of a rectangular mesh, one reason for this preference being that the triangular mesh contains a multiplicity of elements which are brought into effective service. Referring, for example, to Fig. 3, in which there is shown the bent wire-netting having the triangular mesh, the long member 7ª, of the bend, which may be considered as one foot in length, contains groups of polygons of six triangular elements, which triangles are indicated at a, b, c, d, e and f, which elements are under tension when the stretch of netting is under stress. In the short member 7ᵇ, of the bend, which is about one-third the length of the long member, there are also a multiplicity of elements, which by reason of their diagonal disposition act as compression and tension members, when this member is subjected to a vertical strain, as will be understood particularly from Figs. 2 and 3.

One of the important advantages in using my peculiar form of corrugated netting is that it restores itself to normal shape after being bent in sliding the slab into place from an incline.

I wish to be understood as not limiting my invention to the particular construction of the various different parts as herein shown, as it is evident that modifications may be made in the several different parts without, however, departing from the spirit of my invention.

Having thus described my invention, what I claim and desire to secure by Letters Patent is:

1. A protective covering for the purpose set forth comprising a sheet of plastic unset material capable of hardening and having a flexible reinforcing sheet of open-work metal embedded therein substantially on the median plane thereof and formed with a series of bends for assisting in retaining the plastic material in place while in unset condition, said covering being adapted to be transported and applied in unset plastic condition to the surface to be protected and by virtue of its flexibility to harden on said surface in substantial conformation thereto.

2. A protective covering for the purpose set forth comprising a sheet of plastic unset material capable of hardening and having a flexible reinforcing sheet of open-work metal embedded therein substantially on the median plane thereof and formed with a series of parallel bends and flexible on such parallel bends to facilitate the covering resuming shape after being flexed, said covering being adapted to be transported and applied in unset plastic condition to the surface to be protected and by virtue of its flexibility to harden on said surface in substantial conformation thereto.

3. A protective covering for the purpose set forth comprising a sheet of plastic unset material capable of hardening and having embedded therein flexible metal reinforcing means formed with stepped parallel bends, said covering being adapted to be transported and applied in unset plastic condition to the surface to be protected and by virtue of its flexibility to harden on said surface in substantial conformation thereto.

4. A protective covering for the purpose set forth comprising a sheet of plastic unset material capable of hardening and having embedded therein triangular meshed wire-netting bent inwardly and outwardly from the median plane with inclined and straight stretches in such manner as to impart to each strand of wire of the netting full values in their reinforcing capacities, said covering being adapted to be transported and applied in unset plastic condition to the surface to be protected and by virtue of its flexibility to harden on said surface in substantial conformation thereto.

5. A protective covering for the purpose set forth comprising a sheet of plastic unset material capable of hardening and having embedded therein reticulated metal bent inwardly and outwardly from the median plane to practically remove the mesh thus bent from a neutral axis to avoid bending moments and to convert the strands of said reticulated metal into compression or tension members, said covering being adapted to be transported and applied in unset plastic condition to the surface to be protected and by virtue of its flexibility to harden on said surface in substantial conformation thereto.

6. A protective covering for the purpose set forth comprising a sheet of plastic unset material capable of hardening and having a flexible reinforcing sheet of open-work metal embedded therein and provided with a series of bends each formed with a long leg and a short one and with the short one substantially normal to the surface of the covering, the said short legs of the bends serving as a gage for determining the thickness of the covering in forming the same.

7. A protective covering for the purpose set forth comprising a sheet of plastic unset material capable of hardening and having a flexible reinforcing sheet of open-work metal embedded therein substantially on the median plane thereof and formed with a series of substantially Z-shaped bends normal to the said plane, said covering being adapted to be transported and applied in unset plastic condition to the surface to be protected and by virtue of its flexibility to harden on said surface in substantial conformation thereto.

8. A protective covering for the purpose set forth comprising a sheet of plastic unset material capable of hardening and having a flexible reinforcing sheet of open-work metal embedded therein substantially on the median plane thereof and formed with a series of bends for assisting in retaining the plastic material in place while in unset condition, and having one or both of its broadsides provided with a non-metallic coating or facing for protecting the plastic material while unset, said covering being adapted to be transported and applied in unset plastic condition to the surface to be
5 protected and by virtue of its flexibility to harden on said surface in substantial conformation thereto.

In testimony whereof, I have hereunto set my hand in the presence of the two subscribing witnesses.

ALEXANDER CRAWFORD CHENOWETH.

Witnesses:
    WILLIS FOWLER,
    EDWARD HAYES.